United States Patent
Shen

(10) Patent No.: US 9,146,575 B2
(45) Date of Patent: Sep. 29, 2015

(54) POWER CONVERTER AND OPERATING METHOD THEREOF

(71) Applicant: uPI Semiconductor Corporation, Zhubei, Hsinchu County (TW)

(72) Inventor: Chien-Yuan Shen, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 319 days.

(21) Appl. No.: 13/798,562

(22) Filed: Mar. 13, 2013

(65) Prior Publication Data

US 2014/0077784 A1 Mar. 20, 2014

(30) Foreign Application Priority Data

Sep. 18, 2012 (TW) .............................. 101134162 A

(51) Int. Cl.
| | |
|---|---|
| G05F 1/67 | (2006.01) |
| G05F 5/00 | (2006.01) |
| H02M 3/155 | (2006.01) |
| H02M 1/00 | (2007.01) |

(52) U.S. Cl.
CPC ................. *G05F 5/00* (2013.01); *H02M 3/155* (2013.01); *H02M 2001/0022* (2013.01)

(58) Field of Classification Search
CPC ... H02M 3/156; H02M 3/157; H02M 3/1588; G05F 1/67
USPC .................................. 323/282–285, 299, 351
See application file for complete search history.

(56) References Cited

U.S. PATENT DOCUMENTS

| | | | | |
|---|---|---|---|---|
| 8,022,680 | B2 | 9/2011 | Ryoo | |
| 8,080,987 | B1* | 12/2011 | Qiu et al. | 323/288 |
| 8,334,683 | B2* | 12/2012 | Huang et al. | 323/283 |
| 8,446,138 | B2* | 5/2013 | Ryoo | 323/288 |
| 8,878,504 | B2* | 11/2014 | Komiya | 323/283 |
| 2011/0057636 | A1* | 3/2011 | Su et al. | 323/285 |
| 2011/0095741 | A1* | 4/2011 | Huang et al. | 323/283 |
| 2012/0019225 | A1 | 1/2012 | Tsai | |
| 2013/0147446 | A1* | 6/2013 | Kris et al. | 323/273 |
| 2013/0265024 | A1* | 10/2013 | Chen | 323/282 |
| 2013/0293211 | A1* | 11/2013 | Chen | 323/282 |

FOREIGN PATENT DOCUMENTS

TW 201206033 A 2/2012

OTHER PUBLICATIONS

Taiwan Office Action dated Jul. 8, 2014.
Office Action issued in corresponding patent application in China (dated Jul. 3, 2015).

* cited by examiner

*Primary Examiner* — Adolf Berhane
(74) *Attorney, Agent, or Firm* — McClure, Qualey & Rodack, LLP

(57) ABSTRACT

A power converter and an operating method therefore are disclosed. The power converter includes an output stage, an input voltage detecting unit, and a pulse width modulation (PWM) unit. The output stage is coupled between an input terminal and a ground terminal. The input voltage detecting unit is used to detect an input voltage. The PWM unit is coupled to the output stage and the input voltage detecting unit and used to provide a PWM signal to the output stage. The PWM unit adjusts an on-time of a switch conducting signal of the PWM signal according to the input voltage and a default voltage. When the input voltage is lower than the default voltage, the PWM unit increases the on-time of the switch conducting signal and a period of the PWM signal.

10 Claims, 4 Drawing Sheets

POWER CONVERTER AND OPERATING
METHOD THEREOF

BACKGROUND OF THE INVENTION

1. Field of the Invention

The invention relates to a DC-DC converter; in particular, to a power converter capable of converting the decreased input voltages into expected output voltages and an operating method thereof.

2. Description of the Prior Art

In general, an input voltage inputted to a power converter should be certain extent higher than an expected output voltage to smoothly generate the expected output voltage. However, because the input voltage is often decreased with time, the output voltage generated by the power converter fails to reach the expected output voltage.

As shown in FIG. 1, under the constant-on-time (COT) pulse width modulation (PWM) structure, an amplifier 10 of a power converter 1 receives a feedback voltage $V_{FB}$ (related to an output voltage) and a reference voltage $V_{ref}$. Once the feedback voltage $V_{FB}$ is lower than the reference voltage $V_{ref}$, it means that the output voltage $V_{OUT}$ generated by the power converter 1 is obviously too low. Therefore, a PWM unit 12 outputs a PWM signal PWM having a fixed on-time ($T_{on}$) to an output stage 14 to charge an output capacitor C to increase the output voltage $V_{OUT}$.

As shown in FIG. 2, each on-time $T_{on}$ in the PWM signal PWM is followed by an off-time $T_{off}$. The combination of an on-time $T_{on}$ and an off-time $T_{off}$ is defined as a period of the PWM signal PWM. At first (before the time $t_a$), because the input voltage $V_{IN}$ is high enough and has a fixed value, the on-time $T_{on}$/the off-time $T_{off}$ is fixed and repeatedly appear. With the decreasing of the input voltage $V_{IN}$ from the time $t_a$, although the period of the PWM signal PWM won't be changed, the on-time $T_{on}$ of the period is increased and the off-time $T_{off}$ of the period is decreased to keep the output voltage $V_{OUT}$ at the expected value instead of becoming lower. However, after the input voltage $V_{IN}$ is decreased to a threshold voltage $V_{th}$ at a time $t_b$, the period of the PWM signal PWM is still fixed and the off-time $T_{off}$ of the period can't be further decreased. Therefore, the on-time $T_{on}$ be fixed and fail to provide enough charging time, and the output voltage $V_{OUT}$ be decreased with the decreasing of the input voltage $V_{IN}$. It seriously affects the voltage conversion efficiency of the power converter 1.

Therefore, the invention provides a power converter and an operating method therefore to solve the above-mentioned problems occurred in the prior arts.

SUMMARY OF THE INVENTION

A scope of the invention is to provide a power converter. In a preferred embodiment, the power converter includes an output stage, an input voltage detecting unit, and a PWM unit. The output stage is coupled between an input terminal and a ground terminal. The input voltage detecting unit is used to detect an input voltage. The PWM unit is coupled to the output stage and the input voltage detecting unit and used to provide a PWM signal to the output stage. The PWM unit adjusts an on-time of a switch conducting signal of the PWM signal according to the input voltage and a default voltage. When the input voltage is lower than the default voltage, the PWM unit increases the on-time of the switch conducting signal and a period of the PWM signal.

In an embodiment, the PWM unit includes a time calculation unit used for calculating the on-time and a minimum off-time of the switch conducting signal.

In an embodiment, the time calculation unit includes a current source, a capacitor, a switch, and a comparator. The current source relates to the input voltage. The capacitor is coupled between the current source and the ground terminal. One terminal of the switch is coupled to a node between the current source and the capacitor and the other terminal of the switch is coupled to the ground terminal. One terminal of the comparator is coupled to the node between the current source and the capacitor and the other terminal of the comparator is coupled to an output voltage.

In an embodiment, when the input voltage is maintained at a fixed value higher than the default voltage, the PWM unit keeps the period of the PWM signal and the on-time of the switch conducting signal unchanged.

In an embodiment, when the input voltage is decreased but not lower than the default voltage, the PWM unit keeps the period of the PWM signal unchanged and increase the on-time of the switch conducting signal.

In an embodiment, when the input voltage is lower than the default voltage, an off-time of the switch conducting signal has reached a minimum off-time, and the PWM unit increases the period of the PWM signal and the on-time of the switch conducting signal simultaneously.

Another scope of the invention is to provide an operating method for a power converter. In a preferred embodiment, the power converter includes an output stage coupled between an input terminal and a ground terminal. The operating method includes following steps of: (a) detecting an input voltage; (b) providing a PWM signal to the output stage; (c) adjusting an on-time of a switch conducting signal of the PWM signal according to the input voltage and a default voltage; and (d) increasing the on-time of the switch conducting signal and a period of the PWM signal when the input voltage is lower than the default voltage.

Compared to the prior arts, when the input voltage is decreased to be lower than the default voltage, the power converter of the invention can increase the period of the PWM signal with the decreasing of the input voltage. Therefore, the on-time (Ton) provided by the switch conducting signal can be large enough for the output stage to generate expected output voltage to effectively avoid the drawback of the output voltage of the power converter decreased with the decreasing of the input voltage in the prior arts, and the stability of the output voltage of the power converter can be ensured.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a power converter. In fact, the power converter of the invention can be applied to a fixed frequency DC-DC converter, but not limited to this. The invention can be also applied to a constant-on-time (COT) DC-DC converter.

Figure 1:
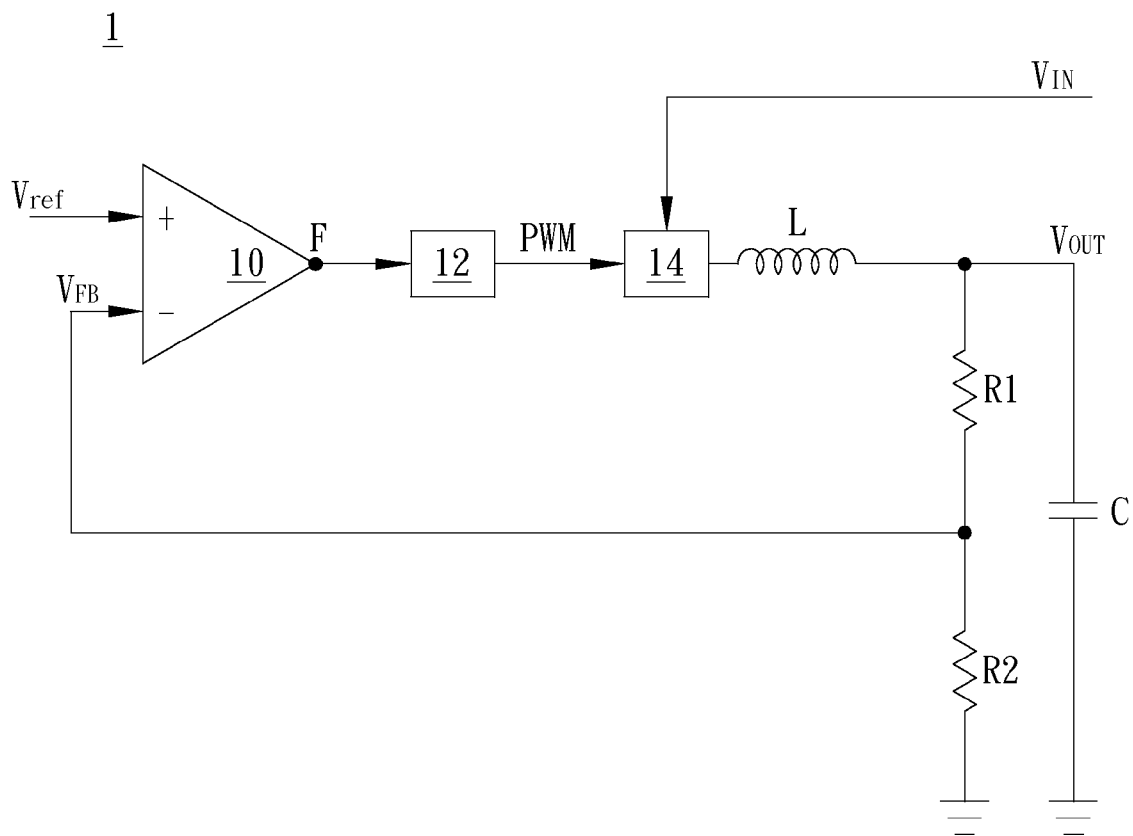
FIG. 1 illustrates a schematic diagram of the circuit structure of a conventional power converter.
Figure 2:
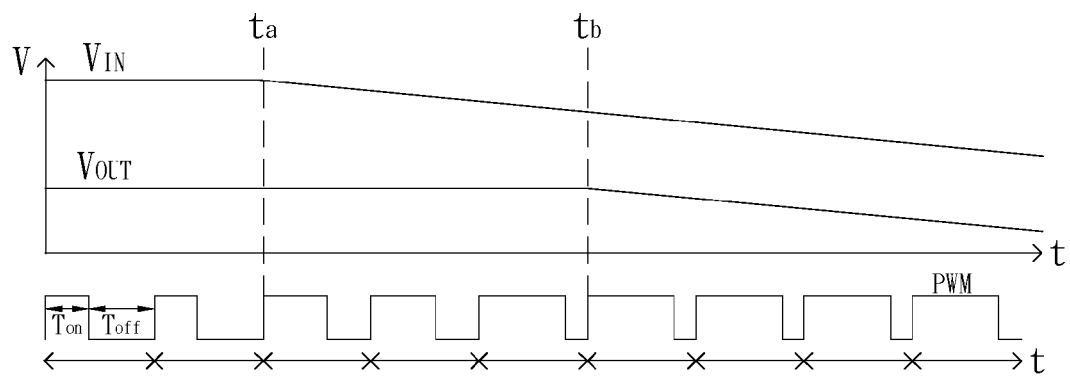
FIG. 2 illustrates timing diagrams of an input voltage, an output voltage, and a PWM signal of the conventional power converter.
Figure 3:
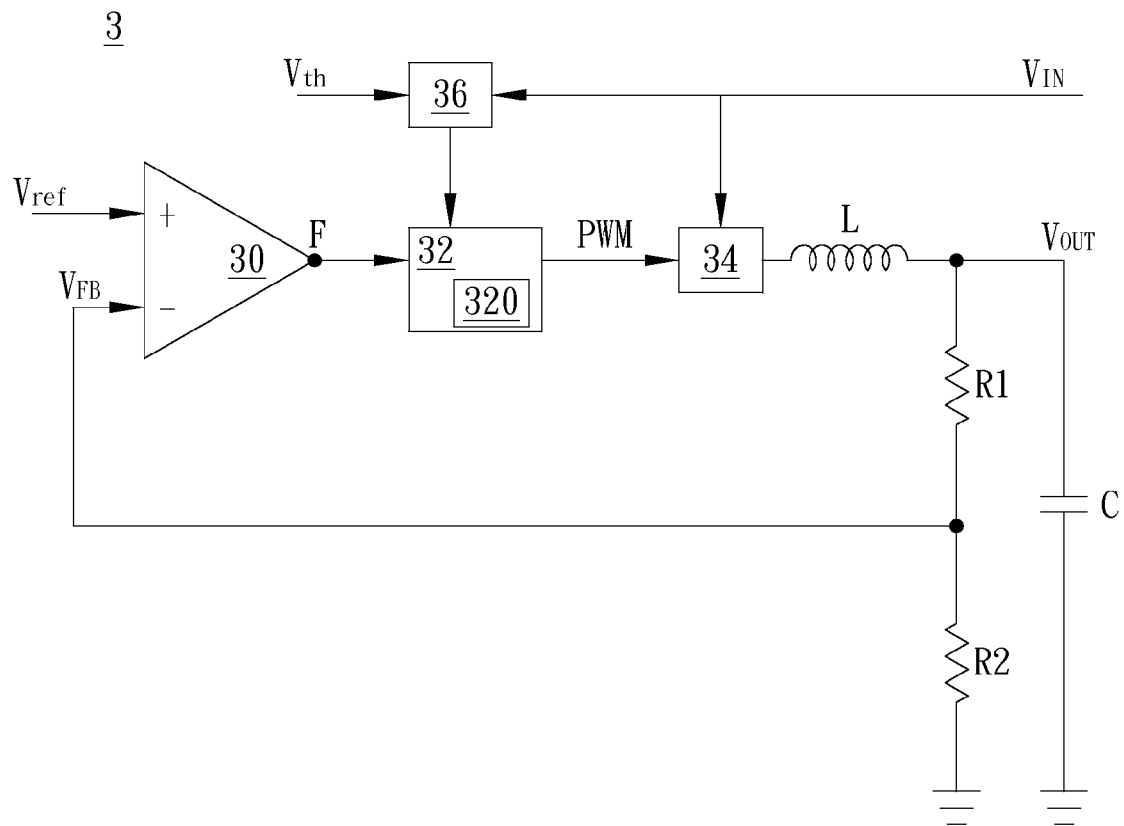
FIG. 3 illustrates a schematic diagram of the circuit structure of a power converter in an embodiment of the invention.

Please refer to FIG. 3. FIG. 3 illustrates a schematic diagram of the circuit structure of a power converter in this embodiment. As shown in FIG. 3, the power converter 3 includes an output stage 34, an amplifier unit 30, an input voltage detecting unit 36, and a PWM unit 32. The output stage 34 is coupled between an input terminal and a ground terminal, and the output stage 34 is coupled to the PWM unit 32 and an output inductor L; the input voltage detecting unit 36 is coupled to the input terminal and the PWM unit 32; the PWM unit 32 is coupled to the amplifier unit 30, the output stage 34, and the input voltage detecting unit 36; the amplifier unit 30 is coupled to the output stage 34, the PWM unit 32, a first output resistor R1, and a second output resistor R2. The PWM unit 32 includes a time calculation unit 320. In this embodiment, the amplifier unit 30 can be also an error amplifier or a transconductance (GM) amplifier.

The output stage 34 can include a driving unit, an upper switch, and a lower switch. The driving unit is coupled to the PWM unit 32; the upper switch is coupled to the input terminal; the lower switch is coupled to the output terminal; there is a phase node between the upper switch and the lower switch, and the output inductor L is coupled to the phase node. The output inductor L is coupled between the output stage 34 and the output terminal; the first output resistor R1 and the second output resistor R2 are connected in series, and the first output resistor R1 and the second output resistor R2 are coupled to a node between the output inductor L and the output terminal and the ground terminal; a first input terminal of the amplifier unit 30 is coupled to a node between the first output resistor R1 and the second output resistor R2; one terminal of an output capacitor C is coupled to the output terminal and the other terminal of the output capacitor C is coupled to the ground terminal.

In this embodiment, the second terminal and the first input terminal of the amplifier unit 30 receive a reference voltage $V_{ref}$ and a feedback voltage $V_{FB}$ from the output terminal respectively so that the amplifier unit 30 provides a control signal, such as an error signal or a comparison result, to the PWM unit 32. The input voltage detecting unit 36 is used to detect the input voltage $V_{IN}$ from the input terminal and compare the input voltage $V_{IN}$ with a default voltage $V_{th}$ to provide the comparison result of the input voltage $V_{IN}$ and the default voltage $V_{th}$ to the PWM unit 32. When the PWM unit 32 provides a PWM signal PWM to the output stage 34, the PWM unit 32 adjusts an on-time ($T_{on}$) of a switch conducting signal in the PWM signal PWM according to the comparison result of the input voltage $V_{IN}$ and the default voltage $V_{th}$.

In order to prevent the output voltage $V_{OUT}$ of the output terminal from being decreased with the decreasing of the input voltage $V_{IN}$, when the input voltage $V_{IN}$ starts to decrease from the original fixed value, the PWM unit 32 increases the on-time of the switch conducting signal to make the output stage 34 have more time to output larger output voltage $V_{OUT}$ to prevent the output voltage $V_{OUT}$ from being decreased with the decreasing of the input voltage $V_{IN}$ occurred in the prior arts.

When the input voltage $V_{IN}$ is decreased but not lower than the default voltage $V_{th}$, the PWM unit 32 increases the on-time ($T_{on}$) of the switch conducting signal, since the off-time ($T_{off}$) of the switch conducting signal does not reach its minimum off-time, the off-time ($T_{off}$) of the switch conducting signal can be still decreased with the increasing of the on-time ($T_{on}$) to keep the period of the PWM signal PWM unchanged.

Once the input voltage $V_{IN}$ is decreased to be lower than the default voltage $V_{th}$, the PWM unit 32 increases the on-time ($T_{on}$) of the switch conducting signal. At this time, since the off-time ($T_{off}$) of the switch conducting signal has reached its minimum off-time, the off-time ($T_{off}$) fails to be continuously decreased with the increasing of the on-time ($T_{on}$). Therefore, the period of the PWM signal PWM becomes larger with the increasing of the on-time ($T_{on}$) of the switch conducting signal.

Figure 4:
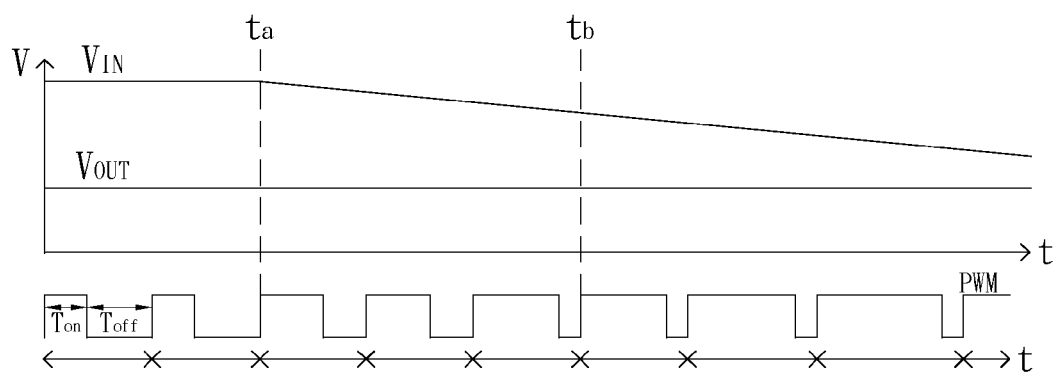
FIG. 4 illustrates timing diagrams of an input voltage, an output voltage, and a PWM signal of the power converter shown in FIG. 3.

Please refer to FIG. 4. FIG. 4 illustrates timing diagrams of the input voltage $V_{IN}$, the output voltage $V_{OUT}$, and the PWM signal PWM of the power converter 3 shown in FIG. 3. As shown in FIG. 4, each on-time $T_{on}$ of the switch conducting signal in the PWM signal PWM is followed by an off-time $T_{off}$. The combination of an on-time $T_{on}$ and an off-time $T_{off}$ is defined as a period of the PWM signal PWM. At first (before the time $t_a$), because the input voltage $V_{IN}$ is high enough and has a fixed value, the on-time $T_{on}$ and the off-time $T_{off}$ is fixed and repeatedly appear. At this time, since the input voltage $V_{IN}$ is not decreased, the PWM unit 32 does not adjust the on-time $T_{on}$ of the switch conducting signal.

With the decreasing of the input voltage $V_{IN}$ from the time $t_a$, the PWM unit 32 increases the on-time $T_{on}$ of the switch conducting signal, so that the output stage 34 have more time to output larger output voltage $V_{OUT}$. During the period from time $t_a$ to $t_b$, although the input voltage $V_{IN}$ is decreased but not lower than the default voltage $V_{th}$, the off-time $T_{off}$ of the switch conducting signal does not reach its minimum off-time, the off-time ($T_{off}$) of the switch conducting signal can be still decreased with the increasing of the on-time ($T_{on}$). Therefore, under the condition that the on-time ($T_{on}$) is increased and the off-time ($T_{off}$) is decreased, the period of the PWM signal PWM can be still kept unchanged.

At the time $t_b$, the input voltage $V_{IN}$ is decreased to be lower than the threshold voltage $V_{th}$, the off-time $T_{off}$ of the switch conducting signal has reached the minimum off-time and it fails to be further decreased. Therefore, when the PWM unit 32 increases the on-time $T_{on}$ of the switch conducting signal, the period of the PWM signal PWM becomes larger with the increasing of the on-time ($T_{on}$) of the switch conducting signal.

Through the above operations, when the input voltage $V_{IN}$ is decreased, the power converter 3 of the invention can still dynamically provide more charging time to the output stage 34, so that the output voltage $V_{OUT}$ outputted by the output stage 34 can be kept at original expected output voltage instead of being decreased with the decreasing of the input voltage $V_{IN}$. Therefore, the power converter 3 of the invention can overcome the drawbacks of the prior arts to continuously provide stable output voltage $V_{OUT}$ no matter how the input voltage $V_{IN}$ changes.

Figure 5:
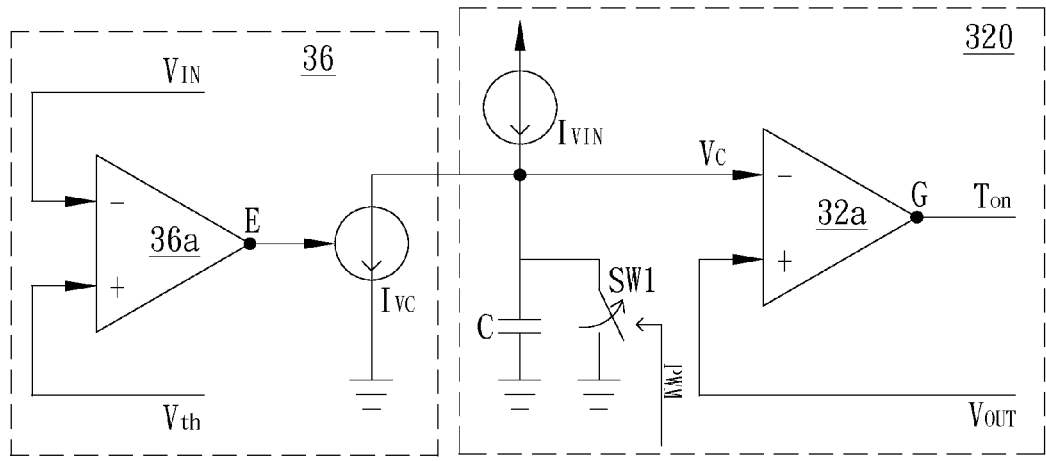
FIG. 5 illustrates a schematic diagram of a time calculation unit cooperated with an input voltage detecting unit.

Then, please refer to FIG. 5. FIG. 5 illustrates a schematic diagram of the time calculation unit 320 cooperated with the input voltage detecting unit 36. As shown in FIG. 5, the time calculation unit 320 includes a comparator 32a, a capacitor C, a switch SW1, and a current source $I_{VIN}$ related to the input voltage $V_{IN}$. The input voltage detecting unit 36 includes a comparator 36a and a voltage-controlled current source $I_{vc}$.

The capacitor C is coupled between the current source $I_{VIN}$ and the ground terminal; one terminal of the switch SW1 is coupled to a node between the current source $I_{VIN}$ and the capacitor C and the other terminal of the switch SW1 is coupled to the ground terminal; a first input terminal of the comparator 32a is coupled to the node between the current source $I_{VIN}$ and the capacitor C and a second terminal of the comparator 32a is coupled to the output voltage $V_{OUT}$; an output terminal G of the comparator 32a outputs the on-time $T_{on}$ of the switch conducting signal; the voltage-controlled current source $I_{vc}$ is coupled to the node between the current source $I_{VIN}$ and the capacitor C and the ground terminal respectively; a first input terminal and a second terminal of the comparator 36a are coupled to the input voltage $V_{IN}$ and the default voltage $V_{th}$ respectively; an output terminal E of the comparator 36a is coupled to the voltage-controlled current source $I_{vc}$.

In this embodiment, whether the switch SW1 is switched on or off is controlled by the PWM signal PWM. When the PWM signal PWM is at low level, the switch SW1 is conducted, and the current source $I_{VIN}$ fails to charge the capacitor C; therefore, a capacitor voltage Vc received by the first input terminal of the comparator 32a is 0. At this time, the output terminal G of the comparator 32a outputs the low-level switch conduction signal; that is to say, the switch conduction signal starts to enter into the off-time $T_{off}$.

When the PWM signal PWM is at high level, the switch SW1 is open, and the current source $I_{VIN}$ can start to charge the capacitor C until the capacitor voltage Vc received by the first input terminal of the comparator 32a is equivalent to the output voltage $V_{OUT}$ received by the second terminal of the comparator 32a. At this time, the output terminal G of the comparator 32a provides the high-level switch conduction signal; that is to say, the switch conduction signal starts to enter into the on-time $T_{on}$ and change the PWM signal PWM to be low level to stop charging the capacitor C.

The period of time from the switch conducting signal starts to be high level until the switch conducting signal changes to be low level is called the on-time $T_{on}$ of the switch conducting signal. Similarly, the period of time from the switch conducting signal starts to be low level until the switch conducting signal changes to be high level is called the off-time $T_{off}$ of the switch conducting signal.

As shown in FIG. 5, the comparator 36a compares the input voltage $V_{IN}$ with the default voltage $V_{th}$ and output a control signal according to the comparison result of the input voltage $V_{IN}$ and the default voltage $V_{th}$ to control the current generated by the voltage-controlled current source $I_{vc}$. When the comparison result obtained by the comparator 36a is that the input voltage $V_{IN}$ is not lower than the default voltage $V_{th}$, the comparator 36a outputs the control signal to control the voltage-controlled current source $I_{vc}$ to generate no current.

Figure 6A:
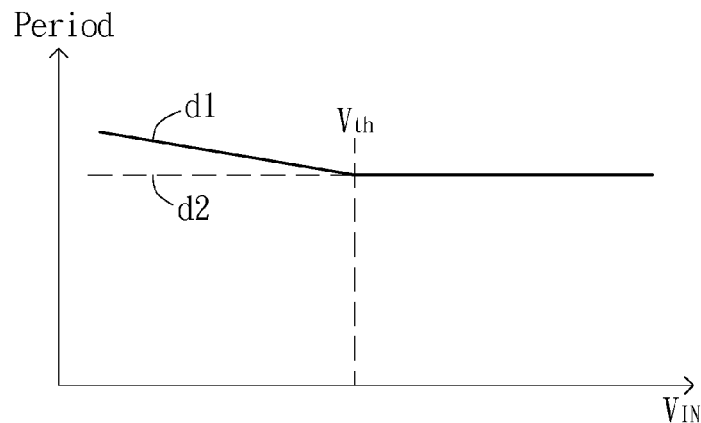
FIG. 6A and FIG. 6B illustrate schematic diagrams of the decreased frequency and the increased period of the PWM signal when the input voltage is lower than a threshold voltage.
Figure 6B:
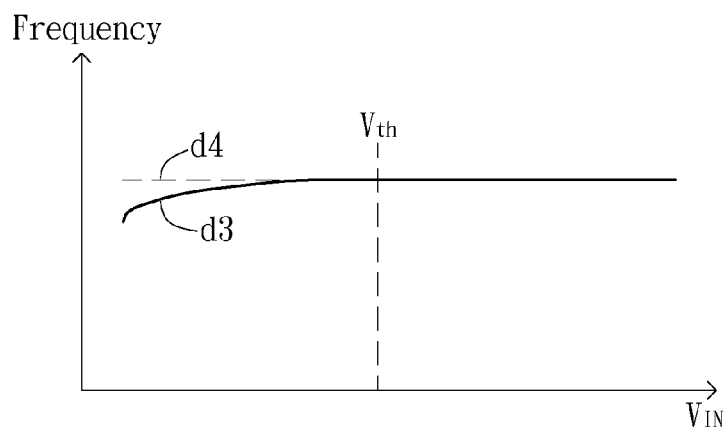

When the comparison result obtained by the comparator 36a is that the input voltage $V_{IN}$ is lower than the default voltage $V_{th}$, the comparator 36a outputs the control signal to control the voltage-controlled current source $I_{vc}$ to start to generate current. Since the current generated by the voltage-controlled current source $I_{vc}$ becomes larger, the charging to the capacitor C done by the current of the current source $I_{VIN}$ becomes decreased. This increases the time needed for the capacitor voltage Vc received by the first input terminal of the comparator 32a to reach the output voltage $V_{OUT}$ received by the second terminal of the comparator 32a. Therefore, the period of the PWM signal PWM is increased (as shown by d1 in FIG. 6A, d2 is the prior art) and the frequency of the PWM signal PWM is decreased (as shown by d3 in FIG. 6B, d4 is the prior art).

Figure 7:
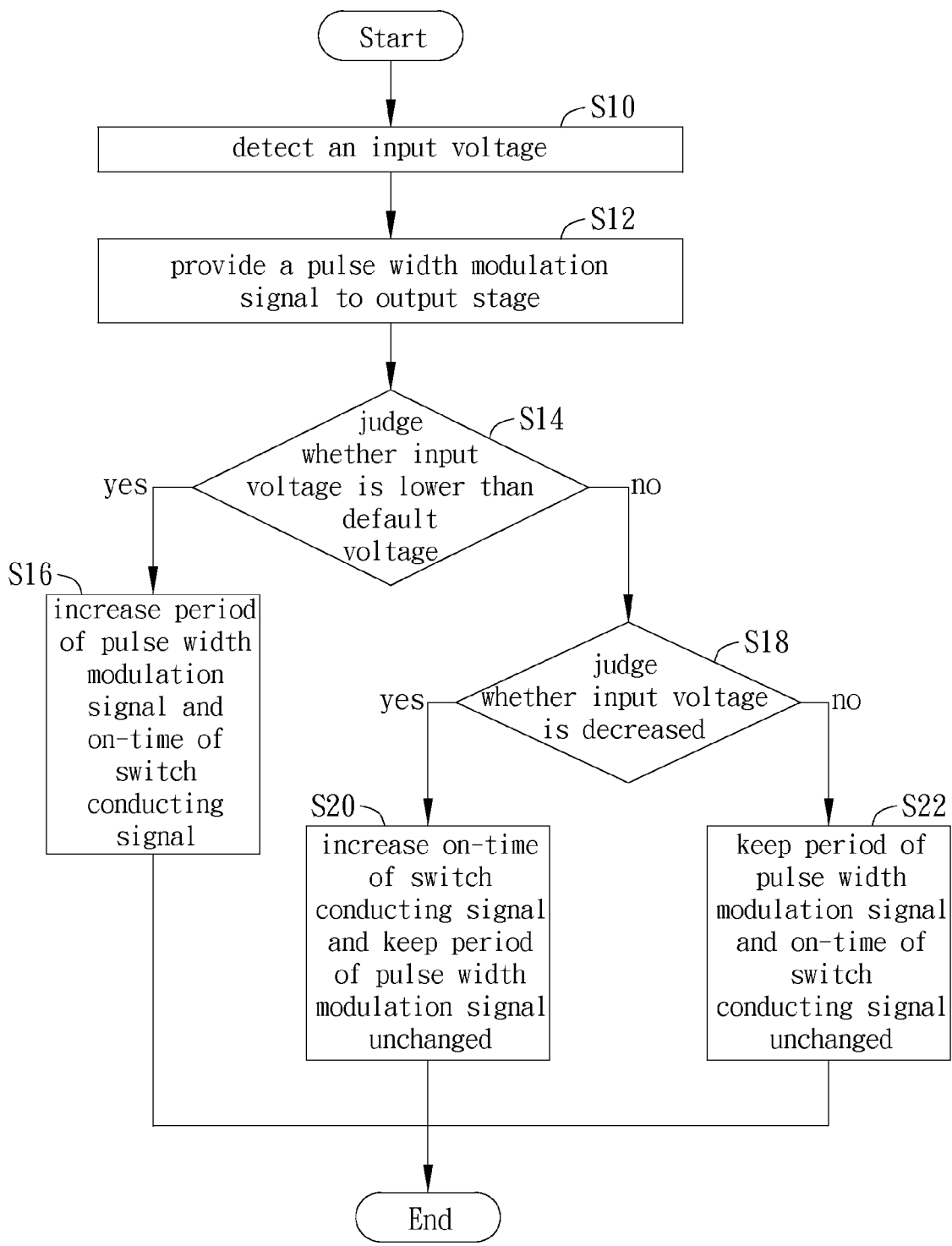
FIG. 7 illustrates a flowchart of the power converter operating method in another embodiment of the invention.

Another embodiment of the invention is an operating method for a power converter. In this embodiment, the power converter includes an output stage coupled between an input terminal and a ground terminal. Please refer to FIG. 7. FIG. 7 illustrates a flowchart of the operating method for the capacitor amplifying circuit in this embodiment.

As shown in FIG. 7, at first, the operating method performs the step S10 to detect an input voltage. In fact, the operating method detects the input voltage from the input terminal, but not limited to this. Next, the operating method performs the step S12 to provide a PWM signal to the output stage. Then, the operating method performs the step S14 to judge whether the input voltage is lower than the default voltage.

When the judgment result of the step S14 is yes, it means that the input voltage is lower than the default voltage, the operating method performs the step S16 to increase the period of the PWM signal and the on-time of the switch conducting signal simultaneously. When the judgment result of the step S14 is no, it means that the input voltage is not lower than the default voltage, the operating method performs the step S18 to judge whether the input voltage is decreased.

When the judgment result of the step S18 is yes, it means that the input voltage is decreased but not lower than the default voltage, the operating method performs the step S20 to increase the on-time of the switch conducting signal and keep the period of the PWM signal unchanged. When the judgment result of the step S18 is no, it means that the input voltage is unchanged instead of being decreased, the operating method performs the step S22 to keep the period of the PWM signal and the on-time of the switch conducting signal unchanged.

Compared to the prior arts, when the input voltage is decreased to be lower than the default voltage, the power converter of the invention can increase the period of the PWM signal with the decreasing of the input voltage. Therefore, the on-time (Ton) provided by the switch conducting signal can be large enough for the output stage to generate expected output voltage to effectively avoid the drawback of the output voltage of the power converter decreased with the decreasing of the input voltage in the prior arts, and the stability of the output voltage of the power converter can be ensured.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power converter, comprising:
   an output stage, coupled between an input terminal and a ground terminal;
   an input voltage detecting unit, for detecting an input voltage; and
   a pulse width modulation (PWM) unit, coupled to the output stage and the input voltage detecting unit, for providing a PWM signal to the output stage;
   wherein the PWM unit adjusts an on-time of a switch conducting signal of the PWM signal according to the input voltage and a default voltage, when the input voltage is lower than the default voltage, the PWM unit increases the on-time of the switch conducting signal and a period of the PWM signal.

2. The power converter of claim 1, wherein the PWM unit comprises a time calculation unit used for calculating the on-time and a minimum off-time of the switch conducting signal.

3. The power converter of claim 2, wherein the time calculation unit comprises a current source, a capacitor, a switch, and a comparator, the current source relates to the input voltage, the capacitor is coupled between the current source and the ground terminal, one terminal of the switch is coupled to a node between the current source and the capacitor and the other terminal of the switch is coupled to the ground terminal, one terminal of the comparator is coupled to the node between the current source and the capacitor and the other terminal of the comparator is coupled to an output voltage.

4. The power converter of claim 1, wherein when the input voltage is maintained at a fixed value higher than the default voltage, the PWM unit keeps the period of the PWM signal and the on-time of the switch conducting signal unchanged.

5. The power converter of claim 1, wherein when the input voltage is decreased but not lower than the default voltage, the PWM unit keeps the period of the PWM signal unchanged and increases the on-time of the switch conducting signal.

6. The power converter of claim 1, wherein when the input voltage is lower than the default voltage, an off-time of the switch conducting signal has reached a minimum off-time, and the PWM unit increases the period of the PWM signal and the on-time of the switch conducting signal simultaneously.

7. An operating method for a power converter, the power converter comprising an output stage coupled between an input terminal and a ground terminal, the operating method comprising steps of:
  (a) detecting an input voltage;
  (b) providing a PWM signal to the output stage;
  (c) adjusting an on-time of a switch conducting signal of the PWM signal according to the input voltage and a default voltage; and
  (d) increasing the on-time of the switch conducting signal and a period of the PWM signal when the input voltage is lower than the default voltage.

8. The operating method of claim 7, wherein when the input voltage is maintained at a fixed value higher than the default voltage, the operating method further comprises a step of:
  keeping the period of the PWM signal and the on-time of the switch conducting signal unchanged.

9. The operating method of claim 7, wherein when the input voltage is decreased but not lower than the default voltage, the operating method further comprises a step of:
  keeping the period of the PWM signal unchanged and increasing the on-time of the switch conducting signal.

10. The operating method of claim 7, wherein when the input voltage is lower than the default voltage, an off-time of the switch conducting signal has reached a minimum off-time, the operating method further comprises a step of:
  increasing the period of the PWM signal and the on-time of the switch conducting signal simultaneously.

\* \* \* \* \*